April 2, 1957 G. J. LUBBEN 2,787,703

RECEIVER FOR TWO RADIO FREQUENCY BANDS

Filed Feb. 17, 1953

INVENTOR.
GERRIT JAN LUBBEN
BY
AGENT

United States Patent Office 2,787,703 Patented Apr. 2, 1957

2,787,703

RECEIVER FOR TWO RADIO FREQUENCY BANDS

Gerrit Jan Lubben, Eindhoven, Netherlands, assignor, by mesne assignments, to North American Philips Company, Inc., New York, N. Y., a corporation of Delaware Application February 17, 1953, Serial No. 337,370

Claims priority, application Netherlands March 3, 1952

6 Claims. (Cl. 250—20)

This invention relates to a receiver for at least two ultra-high frequency ranges, which receiver operates on the super-heterodyne principle. It is known in such receivers to utilize a local oscillator producing, in addition to the fundamental oscillation, a plurality of harmonic oscillations of sufficient strength and to bring about the frequency transformation for high frequencies with the use of a higher harmonic of the frequency of the oscillator, while in the reception of low frequencies the fundamental wave is used for mixing in such manner that in each case the frequency of the incoming signal is reduced to the same intermediate frequency.

The object of the invention is to provide a receiver of this kind in which the frequency-transformation is extremely simple and, furthermore, in each case optimum use is made of the tubes available.

The invention consists in that a crystal detector or diode detector is used for frequency transformation in the high-frequency range and that the tube which serves as a mixture upon reception of oscillations in the low-frequency range is used as the intermediate-frequency amplifier upon reception of oscillations in the high-frequency range.

The invention is intended, more particularly, for television reception in the ranges comprised between 50–220 and 500–900 mc./s., respectively. It is, in this case, advantageous to utilize a high-frequency amplifying stage in the reception of oscillations in the low-frequency range. As a rule, high-frequency amplification is not effective for oscillations of the high-frequency range. According to the invention, in order that the total amplification in the two ranges may nevertheless be equalized, the high-frequency amplifier is used, in addition, as an intermediate-frequency amplifier for reception in the high-frequency range.

In one advantageous embodiment the high-frequency amplifying tube in the intermediate-frequency amplification is used in cathode-base connection, whereas the mixing tube for oscillations of the low-frequency range is used in grid-base connection. This connection is very advantageous for obtaining a high signal-to-noise ratio.

In order that the invention may be readily carried into effect, it will now be described with reference to the accompanying drawing, showing, by way of example, two embodiments thereof.

Figure 1:
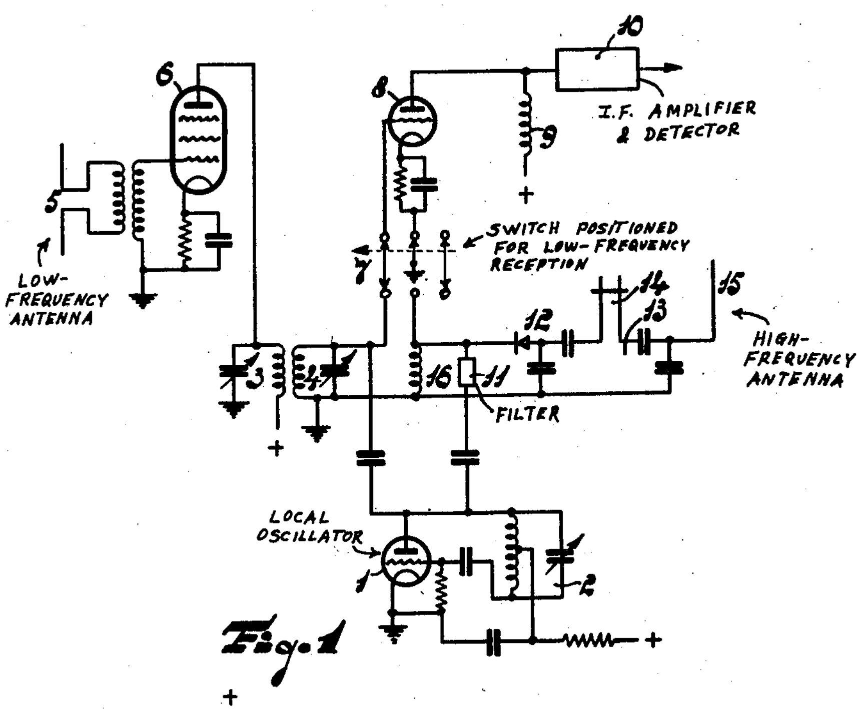
Fig. 1 is a circuit diagram illustrating one embodiment of the invention.

In Fig. 1, reference numeral 1 designates a triode which is active as an oscillator. The generated frequency may be adjusted to the value desired by tuning an oscillatory circuit 2. An aerial 5 used in the reception of oscillations in the low-frequency range is coupled inductively to the circuit of the first control-grid of a high-frequency amplifying pentode 6, the anode circuit of which includes a circuit 3 which is tunable to the signal frequency and which, together with a circuit 4 which is likewise tunable to the signal frequency, constitutes a high-frequency bandpass filter which passes a frequency band of sufficient width. A switch 7, which may comprise three switching arms, occupies the position shown upon reception of signals in the low-frequency range. In this case the cathode of the tube 8, which here serves as a mixing tube, is grounded by way of the parallel combination of a resistor and a capacitor. Consequently, the circuit 4 is located between the control grid and the cathode of the tube 8. The fundamental oscillation of oscillator 1 is also supplied to the control-grid of tube 8 by way of a capacitor. At an inductance 9 occur the intermediate frequency oscillations which are amplified and detected in a further part 10 of the receiver. The inductance, together with the available capacities, constitute a circuit which is tuned to the intermediate frequency and which can pass the band to be received having a width of, for example, 6 mc./s. The intermediate frequency may be, for example, 45 mc./s.

For the reception of oscillations in the high-frequency range the switch 7 is moved to the left, so that the control-grid of tube 8 is connected to ground and an inductance 16 is connected between the cathode and ground. The oscillations coming from an aerial 15 are supplied to a circuit 13, which is tunable to the signal frequency with the use of a Lecher system 14. The crystal detector 12 serves in this case for the frequency transformation of the signal oscillations. The mixture takes place with a harmonic, for example, the third harmonic, of the fundamental oscillation generated by the oscillator 1. This is supplied, by way of filter 11, to the circuit of the crystal detector. The intermediate-frequency oscillations occur at an inductance 16, which together with the available capacities constitutes a circuit of sufficient bandwidth which is tuned to the intermediate frequency. Consequently, the tube 8 is here used in grid-base connection as an intermediate frequency amplifier. The further amplification is effected in a similar manner as for the reception of oscillations in the low-frequency range. The range of variation of the frequency of the oscillator 1 is approximately the same in the reception of each of the said two frequency ranges.

In the circuit shown in Fig. 1, the high-frequency amplifying tube 6 is not operative if oscillations of the high-frequency range are received. A circuit in which such is the case is shown in Fig. 2.

Figure 2:
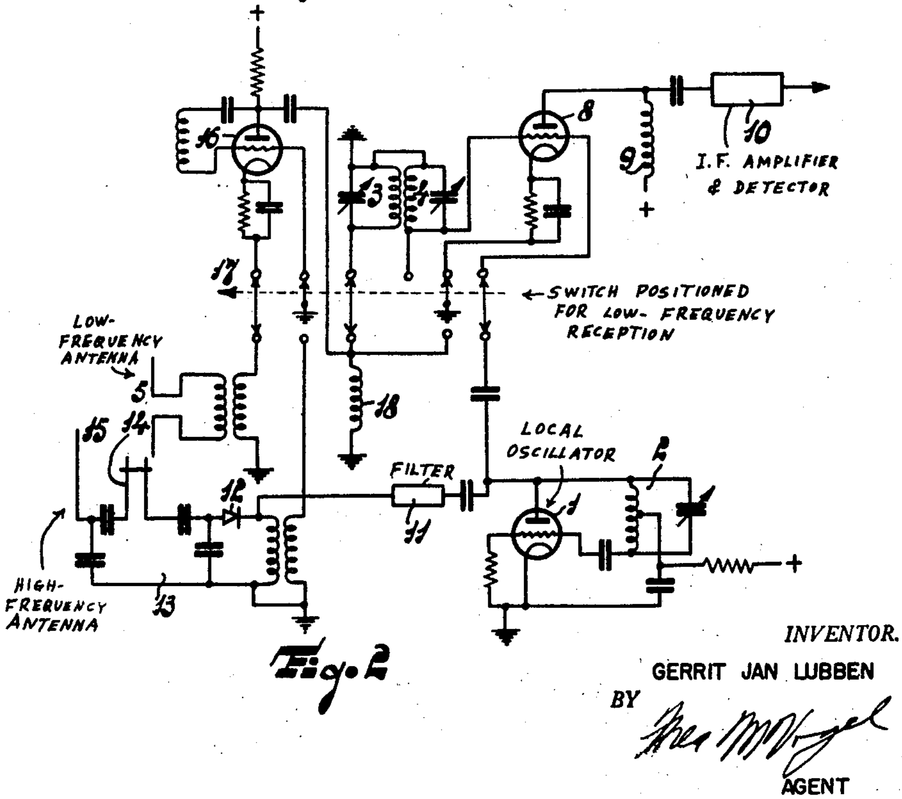
Fig. 2 is a circuit diagram illustrating another embodiment of the invention.

In Fig. 2, identical elements are designated by the same reference numerals as in Fig. 1. The first high-frequency amplifying tube 16 is here connected in a manner somewhat different from that used in Fig. 1, since the incoming oscillations of the low-frequency range are active between the cathode and ground, while the control grid is connected to ground directly by way of one of the arms of switch 17.

The output circuit 3 of the tube 16 is connected between the anode and ground and here constitutes, together with the circuit 4, a bandpass filter of sufficient bandwidth, which is tunable to the incoming frequency. The tube 8 serves as a mixing tube. The circuit 4 is connected between the control grid of tube 8 and ground. The fundamental oscillation of the local oscillator 1 is also supplied to the control grid by way of a capacitor and one of the arms of switch 17.

The switch 17 is moved to the left for reception of oscillations of the high-frequency range, so that the cathode of the tube 16 is connected to ground by way of the parallel combination of a resistor and a capacitor and the grid of this tube is connected to ground by way of an inductance across which the intermediate frequency oscillations occur which are supplied from the crystal detector 12. The series-combination of a capacitor and an inductance between the anode and the control grid of the tube 16 serves to neutralize the anode-grid capacity in the intermediate frequency amplification. The tube 16 then operates as intermediate frequency amplifier in cathode-base connection. An inductance 18, which together with the available capacities, constitutes a circuit of great bandwidth which is tuned to the intermediate frequency, is provided between the cathode of tube 8 and ground. The control grid of tube 8 is connected to ground. Tube 8 thus operates as an intermediate frequency amplifier in grid-base connection, the amplified intermediate frequency oscillations, as before, occurring across the inductance 9.

In both cases the tuning of the local oscillator takes place by means of the variable capacity of the circuit 2. In the reception of oscillations of the low-frequency range there is tuned, in conjunction with the local oscillator, the bandpass filter 3, 4 with the use of the variable condensers, and in the reception of the high frequency range there is tuned, in conjunction with the local oscillator, the Lecher line 14.

While I have thus described my invention with specific examples and embodiments thereof, other modifications will be readily apparent to those skilled in the art without departing from the spirit and the scope of the invention as defined in the appended claims.

What is claimed is:

1. A superheterodyne receiver for the selective reception of two ultra-high-frequency ranges, one of said ranges being a relatively high-frequency range and the other said range being a relatively low-frequency range, comprising a local oscillator circuit provided with means to produce first and second harmonically related local oscillations, a mixer, means to apply the high range signals and the first local oscillations to said mixer to produce a predetermined first intermediate frequency wave, a dual purpose stage including an electron discharge device, a first input circuit for coupling to said device to effect mixing therein, a second input circuit for coupling to said device to effect amplification therein, and a common output circuit coupled to said device, and selective means in a first condition during reception of the low range to apply said low range signals and said second oscillations through said first input circuit to the device of said stage to produce a second intermediate frequency wave having said first predetermined frequency, said latter means further including means in a second condition during the reception of said high range to apply said first intermediate frequency wave through said second input circuit to the device of said stage to produce amplification of said first intermediate frequency wave.

2. A receiver, as set forth in claim 1, further including an amplifier coupled to said selective means for amplifying said low range signals in the first condition.

3. A receiver, as set forth in claim 2, wherein said amplifier is interposed between said mixer and said second input circuit to provide additional amplification of said first intermediate frequency wave in the second condition during the reception of the high range.

4. A receiver, as set forth in claim 3, wherein said mixer includes a diode detector.

5. A receiver, as set forth in claim 3, wherein said mixer includes a crystal detector.

6. A receiver, as set forth in claim 5, wherein said amplifier is used in cathode-base connection and said electron discharge device is used as a second amplifier in grid-base connection in the second condition during the reception of the high range.

References Cited in the file of this patent

UNITED STATES PATENTS

| | | |
|---|---|---|
| 2,141,756 | Linsell | Dec. 27, 1938 |
| 2,186,455 | Goldmark | Jan. 9, 1940 |
| 2,596,117 | Bell et al. | May 13, 1952 |
| 2,665,377 | Krepps | Jan. 5, 1954 |